US012736721B2

(12) United States Patent
Kusaka et al.

(10) Patent No.: US 12,736,721 B2
(45) Date of Patent: Sep. 15, 2026

(54) OPTICAL COMPUTING DEVICE AND OPTICAL COMPUTING METHOD

(71) Applicant: FUJIKURA LTD., Tokyo (JP)

(72) Inventors: Hiroyuki Kusaka, Tokyo (JP); Masahiro Kashiwagi, Tokyo (JP); Yuichiro Kunai, Tokyo (JP)

(73) Assignee: Fujikura Ltd., Tokyo (JP)

( * ) Notice: Subject to any disclaimer, the term of this patent is extended or adjusted under 35 U.S.C. 154(b) by 546 days.

(21) Appl. No.: 18/009,513

(22) PCT Filed: Jun. 30, 2021

(86) PCT No.: PCT/JP2021/024814
§ 371 (c)(1),
(2) Date: Dec. 9, 2022

(87) PCT Pub. No.: WO2023/276061
PCT Pub. Date: Jan. 5, 2023

(65) Prior Publication Data

US 2024/0103207 A1 Mar. 28, 2024

(51) Int. Cl.
*G02B 5/18* (2006.01)
*G02B 5/00* (2006.01)
(Continued)

(52) U.S. Cl.
CPC ............... *G02B 5/18* (2013.01); *G02B 5/005* (2013.01); *G02B 5/1814* (2013.01); (Continued)

(58) Field of Classification Search
None
See application file for complete search history.

(56) References Cited

U.S. PATENT DOCUMENTS 7,847,225 B2 12/2010 Yokoyama
2002/0105725 A1 * 8/2002 Sweatt .................. G02B 27/46 359/566

(Continued)

FOREIGN PATENT DOCUMENTS

CN 105814417 A 7/2016
CN 111226436 A 6/2020

(Continued)

OTHER PUBLICATIONS

International Preliminary Report on Patentability issued in corresponding International Application No. PCT/JP2021/024814 mailed Dec. 14, 2023 (4 pages).

(Continued)

*Primary Examiner* — Paisley L Wilson
(74) *Attorney, Agent, or Firm* — Osha Bergman Watanabe & Burton LLP

(57) ABSTRACT

An optical computing device includes: a light diffraction element group including light diffraction elements having an optical computing function, wherein the light diffraction element group passes light through the light diffraction elements in turn, the light passing through the light diffraction elements was either: reflected or scattered from a non-illuminant object located outside the optical computing device, or emitted from an illuminant object located outside the optical computing device, and neither the non-illuminant object nor the illuminant object is a display.

4 Claims, 8 Drawing Sheets

(51) Int. Cl.
*G02B 27/42* (2006.01)
*G06E 3/00* (2006.01)

(52) U.S. Cl.
CPC ....... *G02B 5/1871* (2013.01); *G02B 27/4233* (2013.01); *G02B 27/4272* (2013.01); *G06E 3/00* (2013.01)

(56) References Cited

U.S. PATENT DOCUMENTS

| | | | | |
|---|---|---|---|---|
| 2006/0050391 | A1* | 3/2006 | Backlund ............. | G02B 5/1847 359/569 |
| 2010/0085559 | A1 | 4/2010 | Ando et al. | |
| 2021/0142170 | A1* | 5/2021 | Ozcan ................ | G02B 27/4205 |

FOREIGN PATENT DOCUMENTS

| | | | |
|---|---|---|---|
| JP | H04-280385 | A | 10/1992 |
| JP | H08-263161 | A | 10/1996 |
| JP | H10-502182 | A | 2/1998 |
| JP | H11-96140 | A | 4/1999 |
| JP | 2002-228441 | A | 8/2002 |
| JP | 2004-020458 | A | 1/2004 |
| KR | 19980050960 | A | 9/1998 |
| WO | 2019/200289 | A1 | 10/2019 |

OTHER PUBLICATIONS

Written Opinion issued in corresponding International Application No. PCT/JP2021/024814 mailed Aug. 3, 2021 (3 pages).

International Search Report issued in corresponding International Application No. PCT/JP2021/024814 mailed Aug. 3, 2021 (3 pages).

Lin, X., et al., "All-Optical Machine Learning Using Diffractive Deep Neural Networks", arxiv.org, Cornell University Library, 201 Olin Library Cornell University Ithaca, NY 14853, Apr. 14, 2018, pp. 1-20, XP081108166, DOI: 10.1126/Science.AAT8084 (20 pages).

Lin, et al., "All-Optical Machine Learning Using Diffractive Deep Neural Networks," Science, vol. 361, No. 6406, pp. 1004-1008, Jul. 26, 2018(6 pages).

* cited by examiner

OPTICAL COMPUTING DEVICE AND OPTICAL COMPUTING METHOD

BACKGROUND

Technical Field

The present invention relates to an optical computing device and an optical computing method for carrying out optical computing by using a light diffraction element.

DESCRIPTION OF THE RELATED ART

A light diffraction element including multiple cells is known. Such a light diffraction element is designed so that signal light waves that have passed through the cells are caused to interfere with each other to optically carry out predetermined computing. Such optical computing using such a light diffraction element has the advantages of high speed computing and low power consumption, as compared with electrical computing using a processor. Furthermore, it is possible to achieve multi-step optical computing (optical computing with two or more steps) by, in turn, causing two or more light diffraction elements arranged in a row to work on signal light.

Patent Literature 1 discloses an optical neural network having an input layer, an intermediate layer, and an output layer. The abovementioned light diffraction element can be utilized as, for example, an intermediate layer for such an optical neural network.

PATENT LITERATURE

Patent Literature 1: U.S. Pat. No. 7,847,225

However, in a conventional optical computing device, light emitted from a display that displays an image including an object as a photographic subject is input into a light diffraction element group, to have the light undergo optical computing of visual information of the object. Thus, in order to generate an image including the object as a photographic subject, it is necessary to convert an optical signal to an electrical signal by using an image sensor. In addition, in order to display the image including the object as a photographic subject, it is necessary to convert the electrical signal to an optical signal by using a display. Therefore, such a conventional optical computing device has room for improvement in both speed and efficiency.

SUMMARY

One or more embodiments can provide an optical computing device or an optical computing method that are capable of carrying out optical computing at a high speed with a high degree of efficiency.

An optical computing device in accordance with one or more embodiments is an optical computing device including a light diffraction element group including at least one light diffraction element having an optical computing function, wherein the light diffraction element group is arranged so as to allow light to pass through the at least one light diffraction element included in the light diffraction element group in turn, the light being light having been reflected or scattered from an object that is located outside the optical computing device, is other than a display, and is not an illuminant, or light having been emitted from an object that is located outside the optical computing device, is other than the display, and is an illuminant.

An optical computing method in accordance with one or more embodiments is an optical computing method for carrying out optical computing by using an optical computing device including a light diffraction element group including at least one light diffraction element, including the step of allowing light to pass through the at least one light diffraction element included in the light diffraction element group in turn, the light being light having been reflected or scattered from an object that is located outside the optical computing device, is other than a display, and is not an illuminant, or light having been emitted from an object that is located outside the optical computing device, is other than the display, and is an illuminant.

According to one or more embodiments, it is possible to provide an optical computing device or an optical computing method that are capable of carrying out optical computing at a high speed with a high degree of efficiency.

DESCRIPTION OF THE EMBODIMENTS

[Configuration of Optical Computing Device]

A configuration of an optical computing device 1 in accordance with one or more embodiments will be described with reference to FIG. 1. (a) of FIG. 1 is a perspective view of the optical computing device 1, and (b) of FIG. 1 is a plan view of the optical computing device 1.

Figure 1:
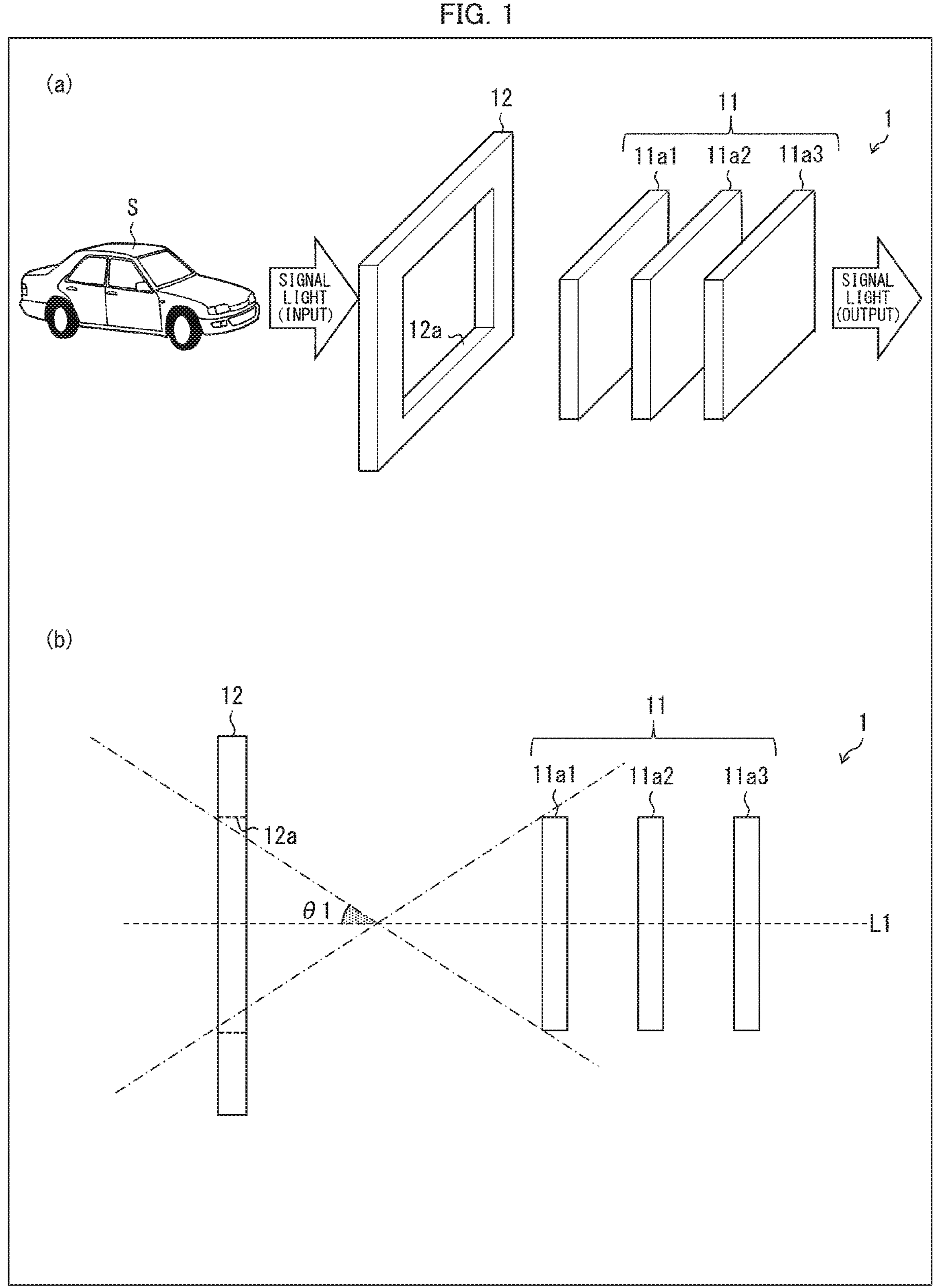
FIG. 1 is a view illustrating a perspective view of an optical computing device in accordance with one or more embodiments and a plan view of the optical computing device.

The optical computing device 1 includes a light diffraction element group 11 and a filter 12, as illustrated in FIG. 1.

The light diffraction element group 11 is a set of n light diffraction elements 11_a_1 to 11_an_. Here, n is any natural number of 1 or more. Each light diffraction element 11_ai_ is an element that has an optical computing function, which is a function for converting a two-dimensional intensity distribution of signal light in accordance with a predetermined conversion rule. Here, i is a natural number of 1 or more and n or less. FIG. 1 illustrates a set of three light diffraction elements 11*a*1 to 11*a*3 as the light diffraction element group 11. A specific example of each light diffraction element 11*ai* will be described later with reference to FIG. 3.

The light diffraction element group 11 is provided so that a first light diffraction element 11*a*1, a second light diffraction element 11*a*2, . . . , and an nth light diffraction element 11*an* are arranged in a straight line on an optical path of signal light. Thus, signal light input into the light diffraction element group 11 passes through the first light diffraction element 11*a*1, the second light diffraction element 11*a*2, . . . , and the nth light diffraction element 11*an* in this order. Therefore, in the light diffraction element group 11, the signal light is subjected to first optical computing carried out by the first light diffraction element 11*a*1, second optical computing carried out by the second light diffraction element 11*a*2, . . . , and nth optical computing carried out by the nth light diffraction element 11*an*, in this order. The two-dimensional intensity distribution of signal light output from the light diffraction element group 11 indicates computation results of these computing processes.

The filter 12 is located at a stage that precedes the light diffraction element group 11. The filter 12 is configured to selectively guide, to the light diffraction element group 11, light which travels in a direction that forms an angle θ of less than or equal to a specific angle with an optical axis L1 of the first light diffraction element 11*a*1 on which signal light is incident first. According to one or more embodiments, a diaphragm having an aperture 12*a* is used as the filter 12. Thus, the specific angle is a maximum value θ1 of the angle formed between the optical axis L1 and an optical axis of a light beam that has passed through the aperture 12*a* of the filter 12, which is a diaphragm, and that is incident on the first light diffraction element 11*a*1. Among light waves that have been incident on the filter 12, a light wave having an angle θ that is formed between the travel direction thereof and the optical axis L1 and that is greater than the specific angle θ1, is absorbed by the filter 12.

In a conventional optical computing device, light emitted from a display that displays an image including an object S as a photographic subject is input into a light diffraction element group, to have the light undergo optical computing of visual information of the object S. In contrast, in the optical computing device 1 in accordance with one or more embodiments, light from the object S itself is input into the light diffraction element group 11, to have the light undergo optical computing of visual information of the object S. To achieve this, the light diffraction element group 11 is arranged so as to allow the light from the object S itself to pass through in turn the n light diffraction elements 11*a*1 to 11*a* included in the light diffraction element group 11. Herein, the "object S" refers to a physical object that is located outside the optical computing device 11 and is other than a display. The wording "light from the object S itself" refers to light having been reflected or scattered from the object S in a case in which the object S is not an illuminant, whereas it refers to light having been emitted from the object S in a case in which the object S is an illuminant. With this, there is no need, in the optical computing device 1 in accordance with one or more embodiments, to convert an optical signal to an electrical signal to generate an image including the object S as a photographic subject. In addition, there is no need to convert an electrical signal to an optical signal to display the image including the object S as a photographic subject. Thus, according to the optical computing device 1 in accordance with one or more embodiments, it is possible to carry out high-speed and efficient optical computing of visual information of the object S, compared with a conventional optical computing device.

The optical computing device 1 may further include an additional image sensor that converts, to an electrical signal, the signal light output from the light diffraction element group 11. Examples of the additional image sensor may include a two-dimensional image sensor that includes multiple light receiving cells arranged in a matrix pattern.

[Effects of Filter]

Effects achieved by the filter 12 of the optical computing device 1 will be described with reference to FIG. 2. (a) and (b) of FIG. 2 are plan views each illustrating the filter 12 and the first light diffraction element 11*a*1 of the optical computing device 1.

Figure 2:
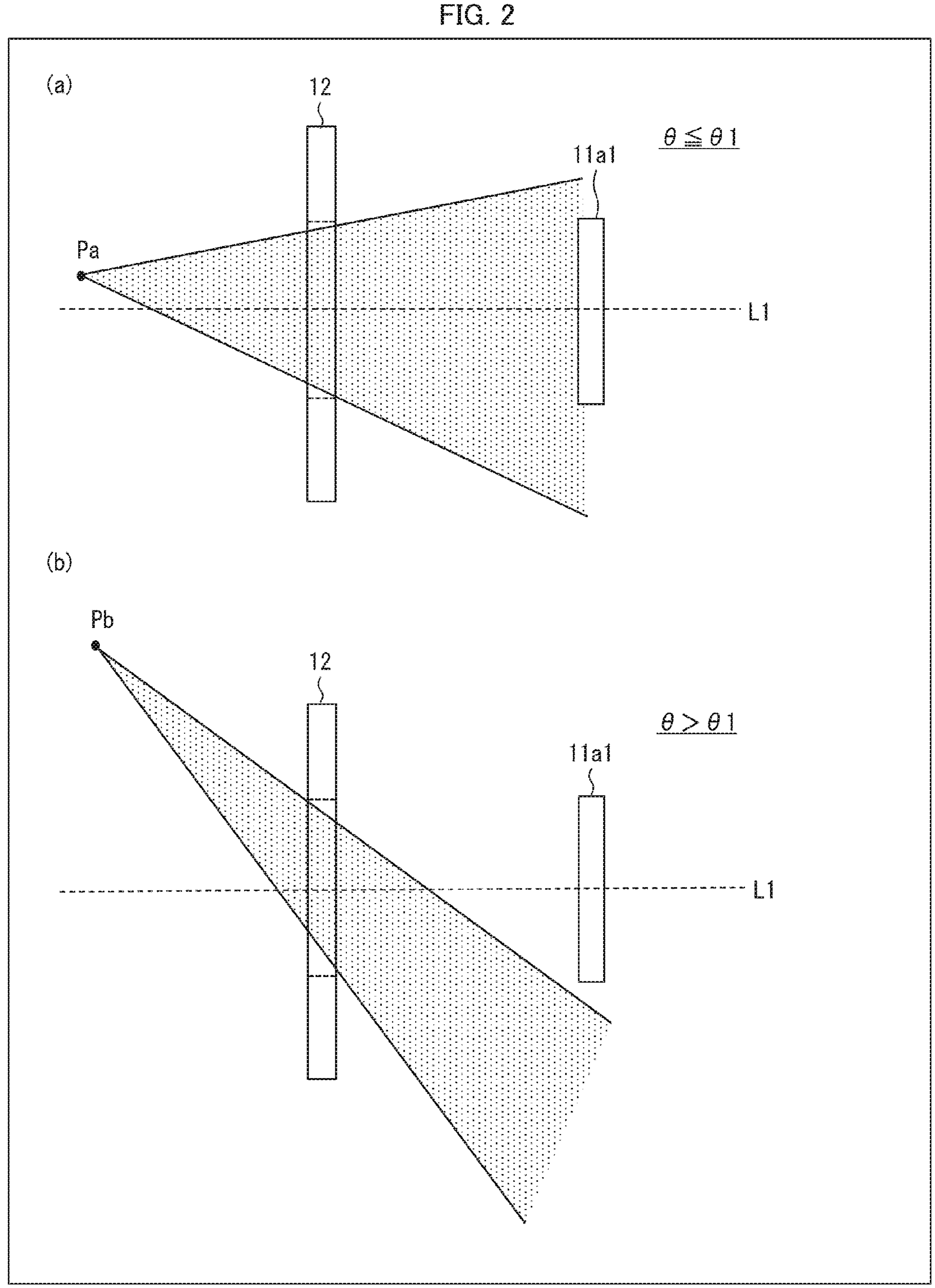
FIG. 2 is a view illustrating a first light diffraction element and a filter (diaphragm) that are provided in the optical computing device illustrated in FIG. 1.

Light from point Pa that is close to the optical axis L1 of the first light diffraction element 11*a*1 forms an angle θ of less than or equal to the abovementioned specific angle θ1 between the travel direction and the optical axis L1, as illustrated in (a) of FIG. 2, and thus, the light can pass through the aperture 12*a* and be incident on the first light diffraction element 11*a*1. One possible example of such light may be light from the object S, that is, signal light.

On the other hand, light from point Pb that is far from the optical axis L1 of the first light diffraction element 11*a*1 forms an angle θ of greater than the abovementioned specific angle θ1 between the travel direction and the optical axis L1, as illustrated in (b) of FIG. 2, and thus, the light cannot pass through the aperture 12*a* and cannot be incident on the first light diffraction element 11*a*1. One possible example of such light may be light other than light from the object S, that is, noise light.

Figure 3:
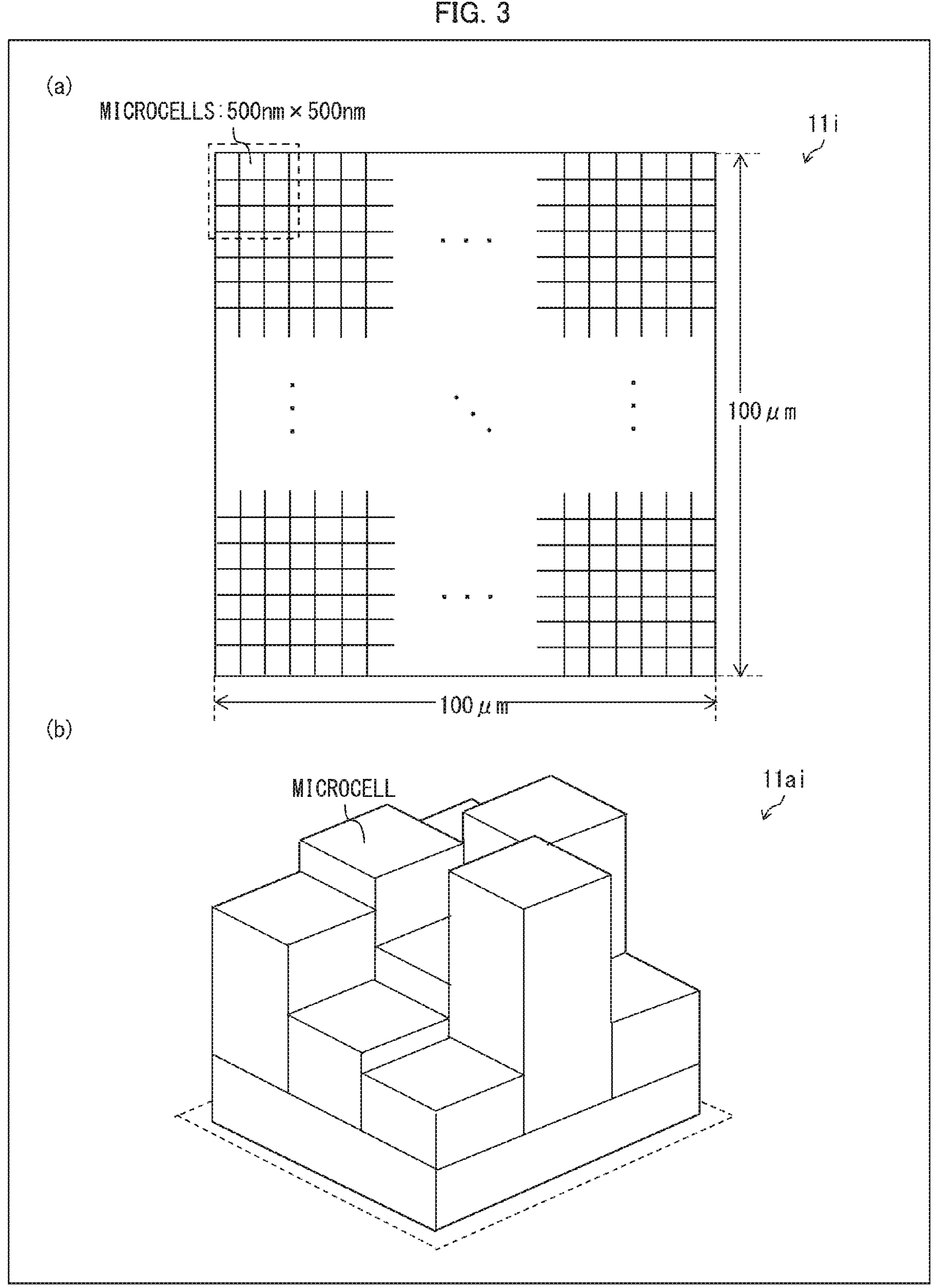
FIG. 3 is a view illustrating a plan view of a light diffraction element provided in the optical computing device illustrated in FIG. 1 and a partial enlarged perspective view of the light diffraction element.

Thus, use of the filter 12 makes it possible to prevent noise light from being incident on the first light diffraction element 11*a*1, without preventing signal light from being incident on the first light diffraction element 11*a*1. Therefore, it is possible to prevent a decrease in computation accuracy due to noise light. [Specific example of light diffraction element] The following description will describe a specific example of the light diffraction element 11*ai* with reference to FIG. 3. (a) of FIG. 3 is a plan view of the light diffraction element 11*ai* in accordance with the present specific example. (b) of FIG. 3 is a partial enlarged perspective view of the light diffraction element 11*ai* in accordance with the present specific example (illustrating a portion indicated by the dotted line in (a) of FIG. 3).

The light diffraction element 11*ai* is constituted by multiple microcells with thicknesses and refractive indexes set independently of each other. When signal light is incident on the light diffraction element 11*ai*, the resulting signal light waves diffracted by the microcells and having different phases interfere with each other. This achieves a predetermined optical computing (conversion of two-dimensional intensity distribution in accordance with a predetermined conversion rule). As used herein, the "microcell" refers to a cell that may have a cell size of less than 10 μm, for example. As used herein, the "cell size" refers to a square root of an area of a cell. For example, when a microcell has a square shape in a plan view, the cell size corresponds to the length of a side of the cell. A lower limit of the cell size may be, for example, 1 nm.

The light diffraction element 11*ai* illustrated in FIG. 3 is constituted by 200×200 microcells arranged in a matrix pattern. Each microcell has a square shape with a size of 500 nm×500 nm in a plan view, and the light diffraction element 11*ai* has a square shape with a size of 100 μm×100 μm in a plan view.

A phase shift amount of signal light passing through microcells can be independently set for each cell by (1) a method in which a thickness of a microcell is independently set for each cell, or (2) a method in which a refractive index of a microcell is independently set for each cell. In one or more embodiments, the method (1), which can be carried out by nanoimprinting, is employed. In this case, each microcell is constituted by a quadrangular prism-shaped pillar having a square bottom surface with four sides that are all equal to the cell size, as illustrated in (b) of FIG. 3. Furthermore, in this case, the phase shift amount of signal light transmitted through each microcell varies depending on the height of the pillar constituting the corresponding microcell. That is, as the height of the pillar constituting the microcell increases, the phase shift amount of signal light transmitted through the microcell increases, and as the height of the pillar constituting the microcell decreases, the phase shift amount of signal light transmitted through the microcell decreases.

Note that the thickness or refractive index of each microcell may be set by, for example, machine learning. A model used in this machine learning may be, for example, a model into which a two-dimensional intensity distribution of signal light input into the light diffraction element 11*ai* is input, and from which a two-dimensional intensity distribution of signal light output from the light diffraction element 11*ai* is output, and in which thicknesses or refractive indexes of the microcells are included as parameters. Here, the "two-dimensional intensity distribution of signal light input into the light diffraction element 11*ai*" refers to a set of intensities of signal light waves input into microcells which constitute the light diffraction element 11*ai*. Further, the "two-dimensional intensity distribution of signal light output from the light diffraction element 11*ai*" refers to a set of intensities of signal light waves each input into a microcell constituting light diffraction element 11*ai*+1, located at a stage that follows the light diffraction element 11*ai*, or a set of intensities of signal light waves input into cells which constitute a light receiving unit that is located at the stage that follows the light diffraction element 11*ai*.

[First Modification of Optical Computing Device]

Figure 4:
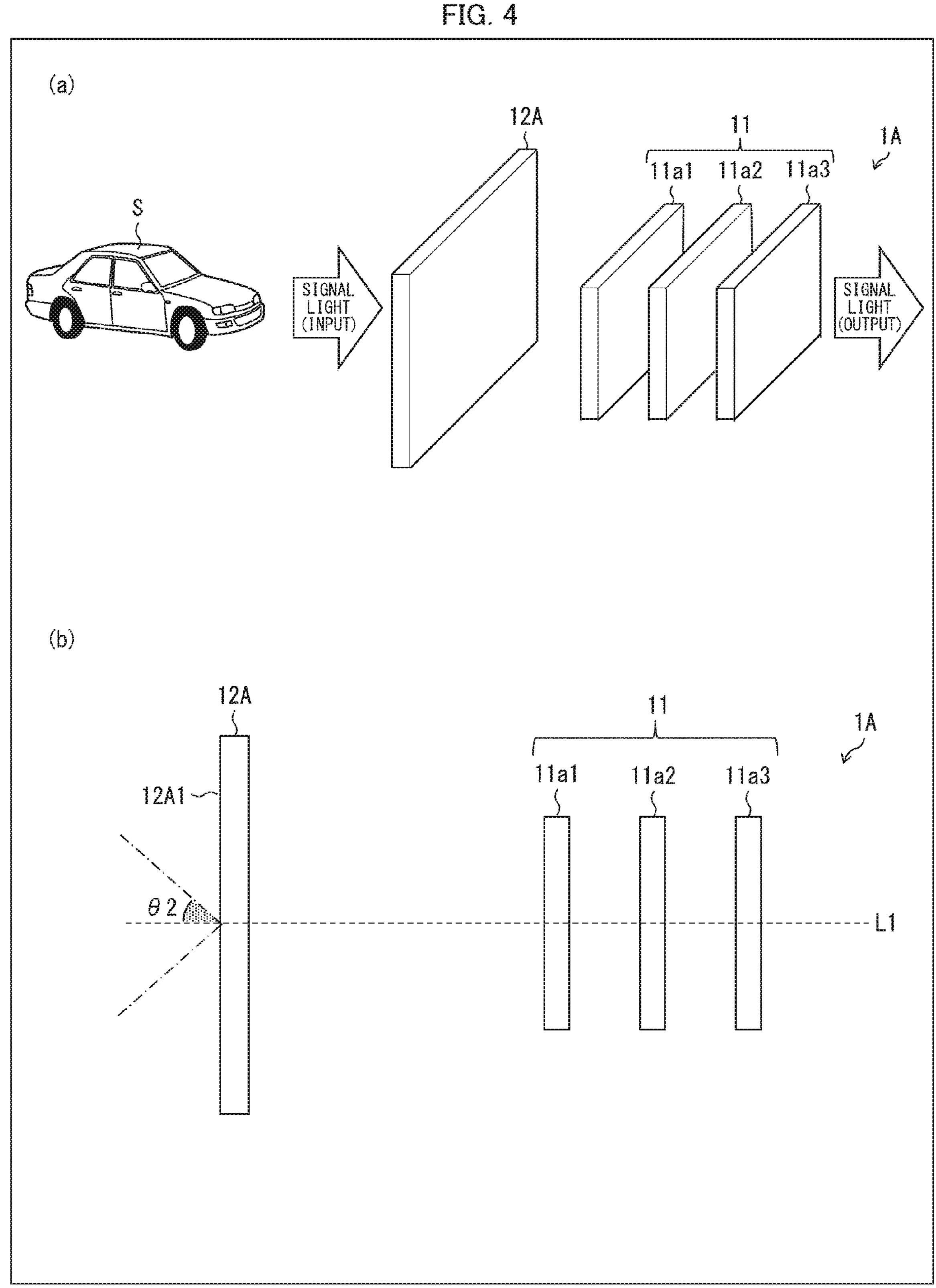
FIG. 4 is a view illustrating a perspective view of an optical computing device in accordance with a first modification of the optical computing device illustrated in FIG. 1 and a plan view of the optical computing device.

A first modification of the optical computing device 1 (hereinafter, referred to as "optical computing device 1A") will be described with reference to FIG. 4. (a) of FIG. 4 is a perspective view of the optical computing device 1A, and (b) of FIG. 4 is a plan view of the optical computing device 1A.

A difference between the optical computing device 1A and the optical computing device 1 is that the optical computing device 1 uses a diaphragm as the filter 12, whereas the optical computing device 1A uses a block as a filter 12A. The block is constituted by a material having a refractive index greater than that of air and is disposed so that a surface 12A1 of the block on a side opposite to a side facing the first light diffraction element 11*a*1 is orthogonal to the optical axis L1.

Similarly to the filter 12, the filter 12A selectively guides, to the light diffraction element group 11, light which travels in a direction that forms an angle θ of less than or equal to a specific angle with the optical axis L1 of the first light diffraction element 11*a*1. In the present modification, the specific angle is a critical angle θ2 at the surface 12A1 of the block constituting the filter 12A. Among light waves that have been incident on the filter 12A, a light wave having an angle θ that is formed between the travel direction thereof and the optical axis L1 and that is greater than the specific angle θ2, is totally reflected by the filter 12A. [Effects of filter in first modification] Effects achieved by the optical computing device 1A will be described with reference to FIG. 5. (a) and (b) of FIG. 5 are plan views each illustrating the filter 12A and the first light diffraction element 11*a*1 of the optical computing device 1A.

Figure 5:
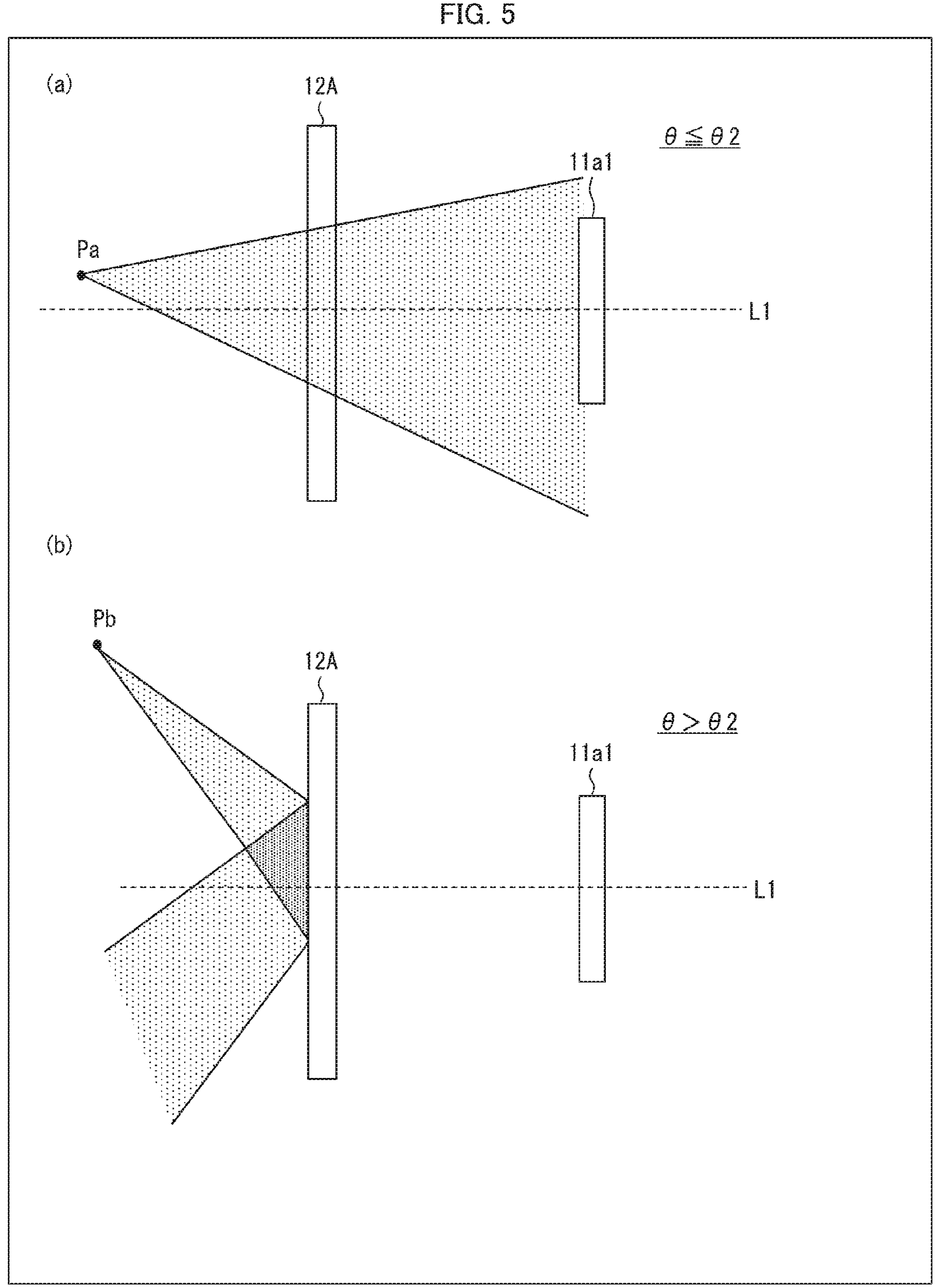
FIG. 5 is a view illustrating a first light diffraction element and a filter (block) that are provided in the optical computing device illustrated in FIG. 4.

Light from point Pa that is close to the optical axis L1 of the first light diffraction element 11*a*1 forms an angle θ of less than or equal to the abovementioned specific angle θ2 between the travel direction and the optical axis L1, as illustrated in (a) of FIG. 5, and thus, the light can be incident on the first light diffraction element 11*a*1. One possible example of such light may be light from the object S, that is, signal light.

On the other hand, light from point Pb that is far from the optical axis L1 of the first light diffraction element 11*a*1 forms an angle θ of greater than the abovementioned specific angle θ2 between the travel direction and the optical axis L1, as illustrated in (b) of FIG. 5, and thus, the light cannot be incident on the first light diffraction element 11*a*1. One possible example of such light may be light other than light from the object S, that is, noise light.

Thus, according to the optical computing device 1A, it is possible to prevent noise light from being incident on the first light diffraction element 11*a*1, without preventing signal light from being incident on the first light diffraction element 11*a*1. Therefore, it is possible to prevent a decrease in computation accuracy due to noise light.

[Second Modification of Optical Computing Device]

Figure 6:
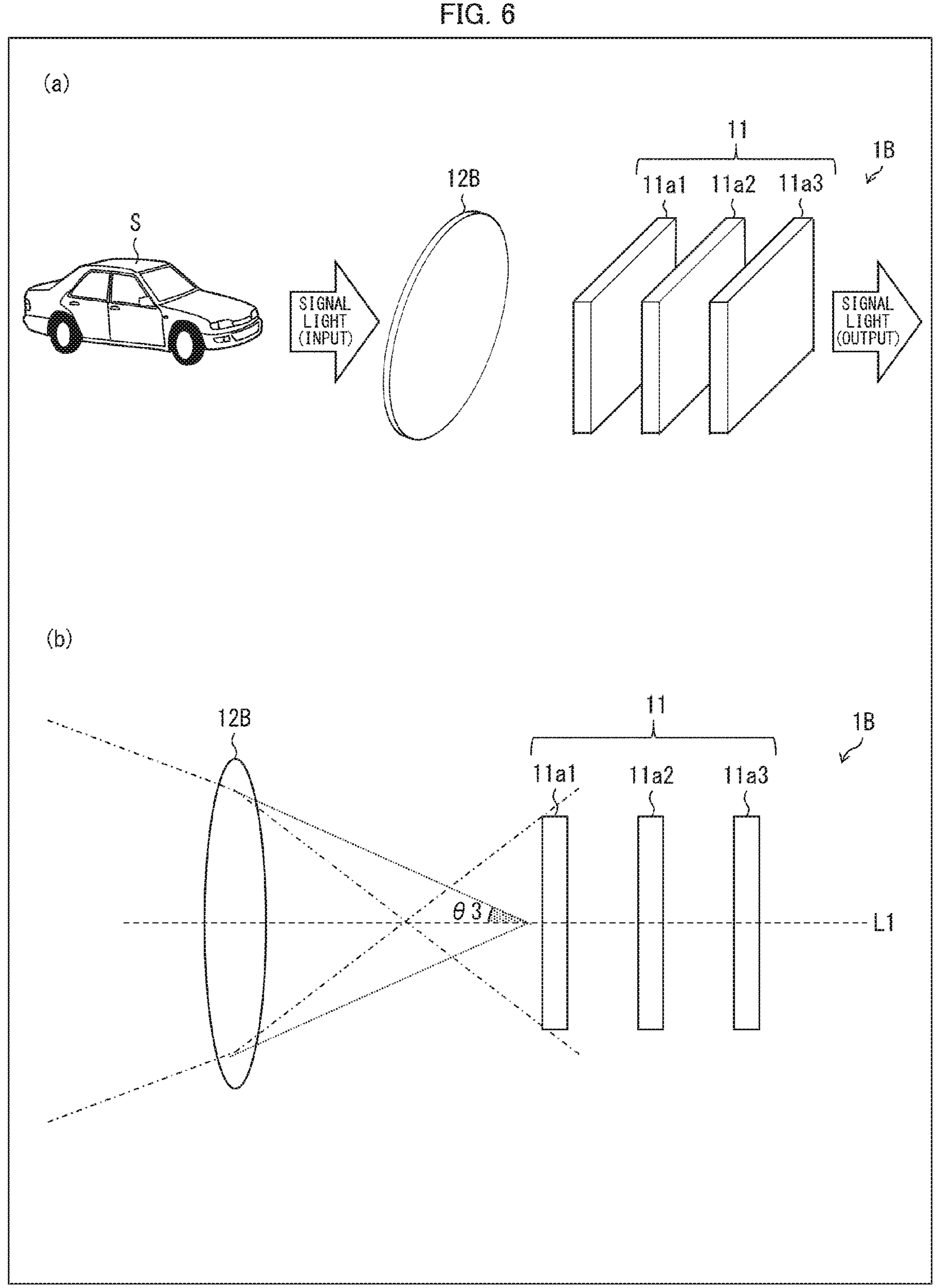
FIG. 6 is a view illustrating perspective view of an optical computing device in accordance with a modification of the optical computing device illustrated in FIG. 1 and is a plan view of the optical computing device.

A first modification of the optical computing device 2 (hereinafter, referred to as "optical computing device 1B") will be described with reference to FIG. 6. (a) of FIG. 6 is a perspective view of the optical computing device 1B, and (b) of FIG. 6 is a plan view of the optical computing device 1B.

A difference between the optical computing device 1B and the optical computing device 1 is that the optical computing device 1 uses a diaphragm as the filter 12, whereas the optical computing device 1B uses a lens as a filter 12B. The lens is constituted by a material having a refractive index greater than that of air, and is disposed so that the optical axis of this lens coincides with the optical axis of the first light diffraction element 11*a*1.

Similarly to the filter 12, the filter 12B selectively guides, to the light diffraction element group 11, light which travels in a direction that forms an angle θ of less than or equal to a specific angle with the optical axis L1 of the first light diffraction element 11*a*1. In the present modification, the specific angle is a maximum value θ3 of the angle formed between the optical axis L1 and an optical axis of a light beam before incidence on the filter 12B, which is a lens, the light beam traveling in a direction that allows the light beam to pass through the filter 12B, which is a lens, and to be incident on the first light diffraction element 11*a*1.

[Effects of Filter in Second Modification]

Effects achieved by the optical computing device 1B will be described with reference to FIG. 7. (a) and (b) of FIG. 7 are plan views each illustrating the filter 12B and the first light diffraction element 11*a*1 of the optical computing device 1B.

Figure 7:
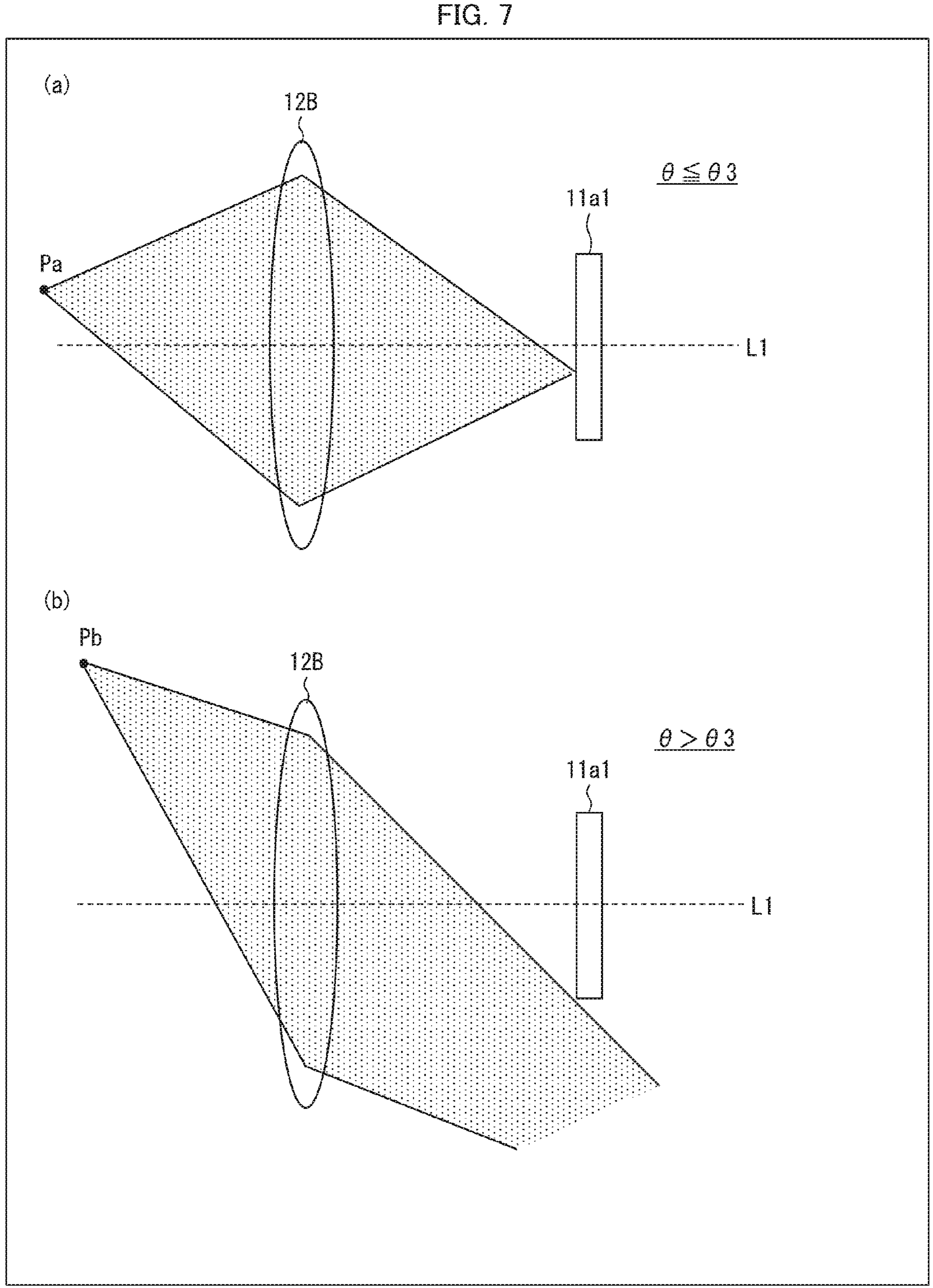
FIG. 7 is view illustrating a first light diffraction element and a filter (lens) that are provided in the optical computing device illustrated in FIG. 6.

Light from point Pa that is close to the optical axis L1 of the first light diffraction element 11*a*1 forms an angle θ of less than or equal to the abovementioned specific angle θ3 between the travel direction and the optical axis L1, as illustrated in (a) of FIG. 7, and thus, the light can be incident on the first light diffraction element 11*a*1. One possible example of such light may be light from the object S, that is, signal light.

On the other hand, light from point Pb that is far from the optical axis L1 of the first light diffraction element 11*a*1 forms an angle θ of greater than the abovementioned specific angle θ3 between the travel direction and the optical axis L1, as illustrated in (b) of FIG. 7, and thus, the light cannot be incident on the first light diffraction element 11*a*1. One possible example of such light may be light other than light from the object S, that is, noise light.

Thus, according to the optical computing device 1B, it is possible to prevent noise light from being incident on the first light diffraction element 11*a*1, without preventing signal light from being incident on the first light diffraction element 11*a*1.

Therefore, it is possible to prevent a decrease in computation accuracy due to noise light.

[Third Modification of Optical Computing Device]

Figure 8:
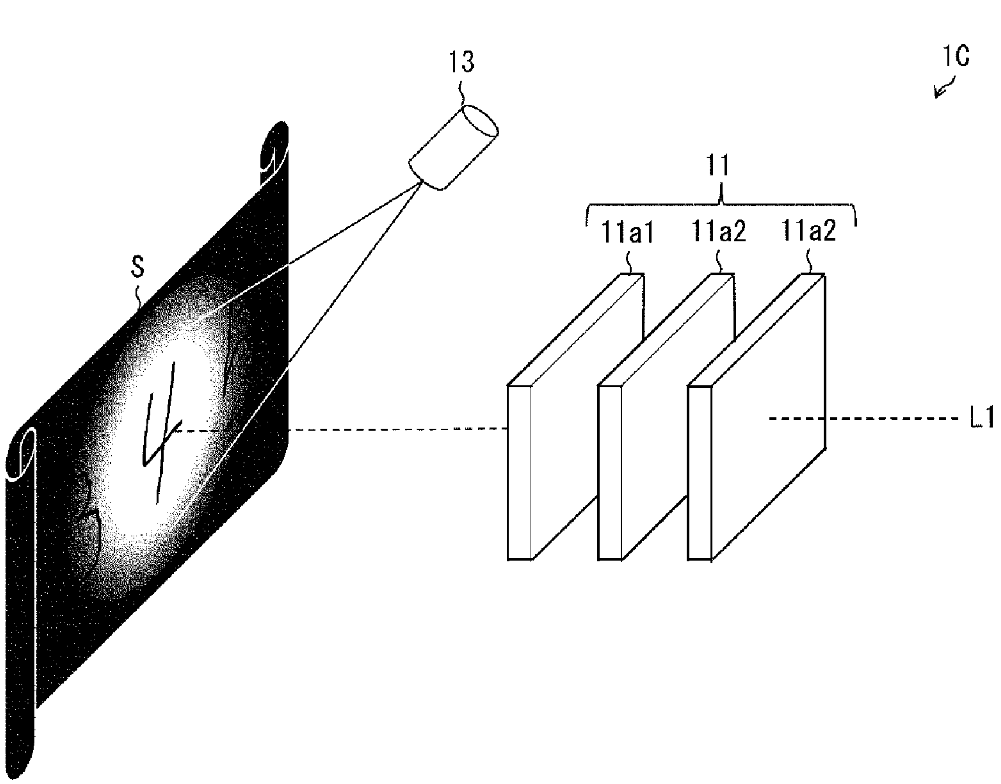
FIG. 8 is a perspective view of an optical computing device in accordance with a modification of the optical computing device illustrated in FIG. 1.

A first modification of the optical computing device 1 (hereinafter, referred to as "optical computing device 1C") will be described with reference to FIG. 8. FIG. 8 is a perspective view of the optical computing device 1C.

Differences between the optical computing device 1C and the optical computing device 1 are that the filter 12 is omitted and a light source 13 is added in the optical computing device 1C. The light source 13 is configured to emit light for illuminating the object S, to a limited specific area including the optical axis L1 of the first light diffraction element 11*a*1. In the illustrated configuration, the object S is a sheet of paper on which some numerals are depicted, and the light diffraction element group 11 is designed to determine which numeral from 0 to 9 is depicted on the sheet of paper.

If an area to be illuminated by the light source 13 is not limited, what might be incident on the light diffraction element group 11 is not only light (signal light) having been reflected or scattered at a region of interest in the object S (in the illustrated example, a region in which "4" is depicted), but also light (noise light) having been reflected or scattered at a region other than the region of interest in the object S (in the illustrated example, regions in which "3" and "5" are depicted) or having been reflected or scattered from a physical object other than the object S. In contrast, if an area to be illuminated by the light source 13 is limited to a specific area including the optical axis L1 of the first light diffraction element 11*a*1, only light having been reflected or scattered at a region of interest in the object S (in the illustrated example, the region in which "4" is depicted) is incident on the light diffraction element group 11.

Thus, according to the optical computing device 1C, it is possible to prevent noise light from being incident on the first light diffraction element 11*a*1, without preventing signal light from being incident on the first light diffraction element 11*a*1. Therefore, it is possible to prevent a decrease in computation accuracy due to noise light.

SUMMARY

The present specification discloses the following aspects.

Aspect 1

An optical computing device including a light diffraction element group including at least one light diffraction element having an optical computing function, wherein the light diffraction element group is arranged so as to allow light to pass through the at least one light diffraction element included in the light diffraction element group in turn, the light being light having been reflected or scattered from an object that is located outside the optical computing device, is other than a display, and is not an illuminant, or light having been emitted from an object that is located outside the optical computing device, is other than the display, and is an illuminant.

Aspect 2

The optical computing device according to Aspect 1, further including a filter located at a stage that precedes the light diffraction element group, wherein the filter selectively transmits light which travels in a direction that forms an angle of less than or equal to a specific angle with an optical axis of a first light diffraction element on which signal light is incident first among the at least one light diffraction element included in the light diffraction element group.

Aspect 3

The optical computing device according to Aspect 2, wherein the filter is a diaphragm, wherein the specific angle is a maximum value of the angle formed between the optical axis of the first light diffraction element and a light beam that has passed through an aperture of the diaphragm and is incident on the first light diffraction element.

Aspect 4

The optical computing device according to Aspect 2, wherein the filter is a block that is constituted by a material having a refractive index greater than that of air and that is disposed so that a surface of the block on a side opposite to a side facing the first light diffraction element is orthogonal to the optical axis, wherein the specific angle is a critical angle at the surface of the block.

Aspect 5

The optical computing device according to Aspect 2, wherein the filter is a lens, wherein the specific angle is a maximum value of the angle formed between the optical axis of the first light diffraction element and a light beam that has passed through the lens and is incident on the first light diffraction element.

Aspect 6

The optical computing device according to Aspect 1, further including a light source that emits light for illuminating the object, to a limited specific area including an optical axis of the first light diffraction element.

Aspect 7

The optical computing device according to any one of Aspects 1 to 6, wherein the light diffraction element group includes at least one light diffraction element including multiple microcells with thicknesses and refractive indexes set independently of each other.

Aspect 8

An optical computing method for carrying out optical computing by using an optical computing device including a light diffraction element group including at least one light diffraction element, including the step of allowing light to pass through at least one light diffraction element included in the light diffraction element group in turn, the light being light having been reflected or scattered from an object that is located outside the optical computing device, is other than a display, and is not an illuminant, or light having been emitted from an object that is located outside the optical computing device, is other than the display, and is an illuminant.

[Supplementary Notes]

The present invention is not limited to the foregoing embodiments, but can be modified by a person skilled in the art within the scope of the claims. The present invention also encompasses, in its technical scope, any embodiment derived by combining technical means disclosed in the foregoing embodiments.

REFERENCE SIGNS LIST

1, 1A, 1B, 1C Optical computing devices
11 Light diffraction element group
11*a*1 to 11*an* Light diffraction elements
12 Filter (diaphragm)
12A Filter (block)
12B Filter (lens)
13 Light source

The invention claimed is:

1. An optical computing device comprising:

a light diffraction element group including light diffraction elements having an optical computing function; and a filter that:

is a block including a material having a refractive index greater than that of air, is not a light diffraction element that includes microcells each having an independently set thickness and refractive index, is disposed between the light diffraction element group and a non-illuminant object or an illuminant object such that a surface of the block on a side opposite to a side facing the light diffraction elements is orthogonal to an optical axis of a first light diffraction element closest to the filter among the light diffraction elements, and selectively transmits light traveling in a direction that forms an angle of less than or equal to a specific angle, which is a critical angle at the surface of the block, with the optical axis, wherein the selectively transmitted light is either:

reflected or scattered from parts of the non-illuminant object and travelling in different directions, wherein the non-illuminant object is located outside the optical computing device and is not a display, or emitted from parts of the illuminant object and travelling in different directions, wherein the illuminant object is located outside the optical computing device and is not a display, wherein the light diffraction element group passes the selectively transmitted light through the light diffraction elements in turn.

2. The optical computing device according to claim 1, further comprising a light source that emits light for illuminating the non-illuminant object or the illuminant object, to a limited specific area including an optical axis of the first light diffraction element.

3. The optical computing device according to claim 1, wherein the light diffraction element group includes at least one additional light diffraction element including multiple microcells with thicknesses and refractive indexes set independently of each other.

4. An optical computing method for carrying out optical computing with an optical computing device comprising a light diffraction element group including light diffraction elements and a filter that is a block including a material having a refractive index greater than that of air, is not a light diffraction element that includes microcells each having an independently set thickness and refractive index, and is disposed between the light diffraction element group and a non-illuminant object or an illuminant object such that a surface of the block on a side opposite to a side facing the light diffraction elements is orthogonal to an optical axis of a first light diffraction element closest to the filter among the light diffraction elements, comprising:

with the filter, selectively transmitting light traveling in a direction that forms an angle of less than or equal to a specific angle, which is a critical angle at the surface of the block, with the optical axis, wherein the selectively transmitted light is either:

reflected or scattered from parts of the non-illuminant object and travelling in different directions, wherein the non-illuminant object is located outside the optical computing device and is not a display, or emitted from parts of the illuminant object and travelling in different directions, wherein the illuminant object is located outside the optical computing device and is not a display; and passing the selectively transmitted light through the light diffraction elements in turn.

* * * * *